United States Patent
Tsai et al.

[19]

[11] Patent Number: 5,953,220
[45] Date of Patent: Sep. 14, 1999

[54] SYSTEM AND METHOD FOR ZERO PHASE ERROR TRACKING OF REFERENCE IN PWM INVERTERS

[75] Inventors: Shan-Chin Tsai; Vietson M. Nguyen, both of Rockford, Ill.

[73] Assignee: Sundstrand Corporation, Rockford, Ill.

[21] Appl. No.: 09/217,425

[22] Filed: Dec. 21, 1998

[51] Int. Cl.$^6$ .............................. H02M 1/12; H03L 7/00
[52] U.S. Cl. ................................. 363/40; 331/17
[58] Field of Search .................................. 363/17, 39, 40, 363/98, 132; 331/16, 17, 25

[56] References Cited

U.S. PATENT DOCUMENTS

| | | | |
|---|---|---|---|
| 3,440,566 | 4/1969 | Swanson | 332/9 |
| 3,636,430 | 1/1972 | Kernick et al. | 321/9 |
| 4,233,658 | 11/1980 | Lupatin et al. | 363/26 |
| 4,489,371 | 12/1984 | Kernick | 363/41 |
| 4,626,979 | 12/1986 | JaQuay | 363/41 |
| 4,672,521 | 6/1987 | Riesco | 363/41 |
| 4,694,383 | 9/1987 | Nguyen et al. | 363/17 |
| 4,862,342 | 8/1989 | Dhyanchand et al. | 363/40 |
| 5,043,857 | 8/1991 | Kirchberg, Jr. et al. | 363/41 |
| 5,053,939 | 10/1991 | Kirchberg, Jr. et al. | 363/41 |
| 5,296,764 | 3/1994 | Asplund et al. | 307/521 |
| 5,301,098 | 4/1994 | Dhyanchand et al. | 363/97 |
| 5,327,335 | 7/1994 | Maddali et al. | 363/39 |
| 5,384,696 | 1/1995 | Moran et al. | 363/40 |
| 5,434,481 | 7/1995 | Nilssen | 315/247 |
| 5,448,204 | 9/1995 | Gardner | 331/25 |
| 5,821,816 | 10/1998 | Patterson | 331/1 A |
| 5,850,336 | 12/1998 | Nakajima | 363/39 |

OTHER PUBLICATIONS

Tomizuka, Masayoshi, "On the Design of Digital Tracking Controllers", ASME Journal of Dynamic Systems, Measurement, and Control, vol. 115, Jun. 1993, pp. 412–418.

Maussion, Pascal, "Instantaneous Feedback Control of a ingle–Phase PWM Inverter with Nonlinear Loads by Sine Wave Tracking", *IEEE DECON '89,* 1989, pp. 130–135.

*Primary Examiner*—Matthew Nguyen
*Attorney, Agent, or Firm*—Marshall, O'Toole, Gerstein, Murray & Borun

[57] ABSTRACT

In an inverting system, a reference $V_{REF}$ is coupled to an input of a predictor. The predictor has an output $V_P$ and a transfer function $T_P$. An inverter of the inverting system has a pulse width modulator, a filter, and a transfer function $T_I$. The transfer function $T_P$ is substantially equal to $1/T_I$. The inverter has an output $V_C$, and the inverter is coupled to the output $V_P$ so that $V_C = V_{REF} T_P T_I = V_{REF}$. In this manner, the output of the inverter tracks the reference without phase error.

21 Claims, 5 Drawing Sheets

SYSTEM AND METHOD FOR ZERO PHASE ERROR TRACKING OF REFERENCE IN PWM INVERTERS

TECHNICAL FIELD OF THE INVENTION

The present invention relates to PWM inverters which produce zero phase errors when tracking a reference.

BACKGROUND OF THE INVENTION

A known inverting system for inverting direct current (DC) to alternating current (AC) relies on the bang-bang control of an inverter switch that receives DC at an input and provides AC at an output. A bang-bang control in this application is robust and provides good reference tracking performance. However, the switching frequency of a bang-bang control arrangement is high. This high switching frequency stresses the inverter switch of the inverter and also cause high power loss in the inverter switch. Moreover, in a bang-bang control arrangement, the switching frequency is not predictable.

On the other hand, an inverting system 10 as shown in FIG. 1 reduces the high switching frequency stress and high power loss of an inverter switch by reducing switching frequency. The inverting system 10 includes a DC source 12, an inverter switch 14, a control 16, and a filter 18. The control 16 controls the inverter switch 14 in order to invert the DC from the DC source 12 to AC for supply to a load 19. The filter 18 shapes and filters the AC provided at the output of the inverter switch 14 in order to produce sinusoidal AC at the output of the inverting system 10.

In FIG. 2, the control 16 is shown in more detail as a conventional pulse width modulator that receives a reference 20, and the individual elements of the filter 18 and the load 19 are represented as transfer functions. The reference 20 is usually in the form of a sinusoidal signal. A first summer 22 of the control 16 subtracts a feedback from the reference 20 in order to produce an error that is processed by a compensator 24. This feedback is derived from an output signal $V_C$ on an inverting system output 26 that is processed by a gain block 28. The gain applied by the gain block 28 is also referred to as a scale factor. The compensator 24 is arranged to stabilize the closed loop system of FIG. 2. A second summer 30 subtracts a triangular wave form 32 from the output of the compensator 24 in order to produce a pulse width modulation signal that is applied to a control input of the inverter switch 14. The inverter switch 14 responds to the pulse width modulation signal in order to convert the DC from the DC source 12 to AC. The output AC of the inverter switch 14 is then filtered by the filter 18 in order to generate sinusoidal AC on the inverting system output 26. This sinusoidal AC on the inverting system output 26 is supplied to the load 19.

If the output signal $V_C$ on the inverting system output 26 matches the reference 20 both in magnitude and phase, the error provided by the first summer 22 is zero. Accordingly, the output pulses at the output of the second summer 30 have a 50% duty cycle. However, as the output signal $V_C$ on the inverting system output 26 varies from the reference 20 in magnitude and/or phase, an error is generated at the output of the first summer 22 which causes the duty cycle of the pulses at the output of the second summer 30 to vary from a 50% duty cycle.

Unfortunately, the filter 18 of the inverting system 10 and the load 19 introduce both an attenuation and a phase shift in the output voltage on the inverting system output 26 with respect to the reference 20 so that the output signal $V_C$ does not quite match the reference 20.

The present invention is directed to a control in which the attenuation and phase shift imposed by the inverting system 10 is predicted so that the predicted attenuation and phase shift can be used to improve the reference tracking capability of the inverting system. Accordingly, the present invention combines the advantages of good reference tracking performance of a bang-bang controller and the low frequency switching characteristics of triangular pulse width modulation.

SUMMARY OF THE INVENTION

In accordance with one aspect of the present invention, an inverting system comprises an inverter having a transfer function $T_I$, a reference, and a predictor. The predictor is coupled in a feed forward manner between the inverter and the reference, and the predictor has a transfer function $T_P$ which is substantially equal to $1/T_I$ so that an output of the inverter tracks the reference with substantially zero phase error.

In accordance with another aspect of the present invention, an inverting system comprises a reference $V_{REF}$, a predictor, and an inverter. The predictor has an input coupled to the reference $V_{REF}$, the predictor has an output $V_P$, and the predictor has a transfer function $T_P$. The inverter has a pulse width modulator and a filter, and the inverter has a transfer function $T_I$. The transfer function $T_P$ is substantially equal to $1/T_I$. The inverter has an output $V_C$, and the inverter is coupled to the predictor so that the predictor operates in a feed forward manner and so that the output $V_{C=VREF}T_PT_I=V_{REF}$.

In accordance with yet another aspect of the present invention, a method of inverting DC to AC comprises the following steps: a) passing a reference $V_{REF}$ through a transfer function $1/(T_I T_{PWM})$; b) pulse width modulating an output of the transfer function $1/(T_I T_{PWM})$ according to a transfer function $T_{PWM}$; c) controlling a switch in accordance with a pulse width modulated output of the transfer function $T_{PWM}$; and, d) processing an output of the switch with a transfer function $T_I$ in order to provide an AC output $V_C$ according to the following equation:

$$V_C = V_{REF}\left(\frac{1}{T_I T_{PWM}}\right) T_{PWM} T_I = V_{REF}$$

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
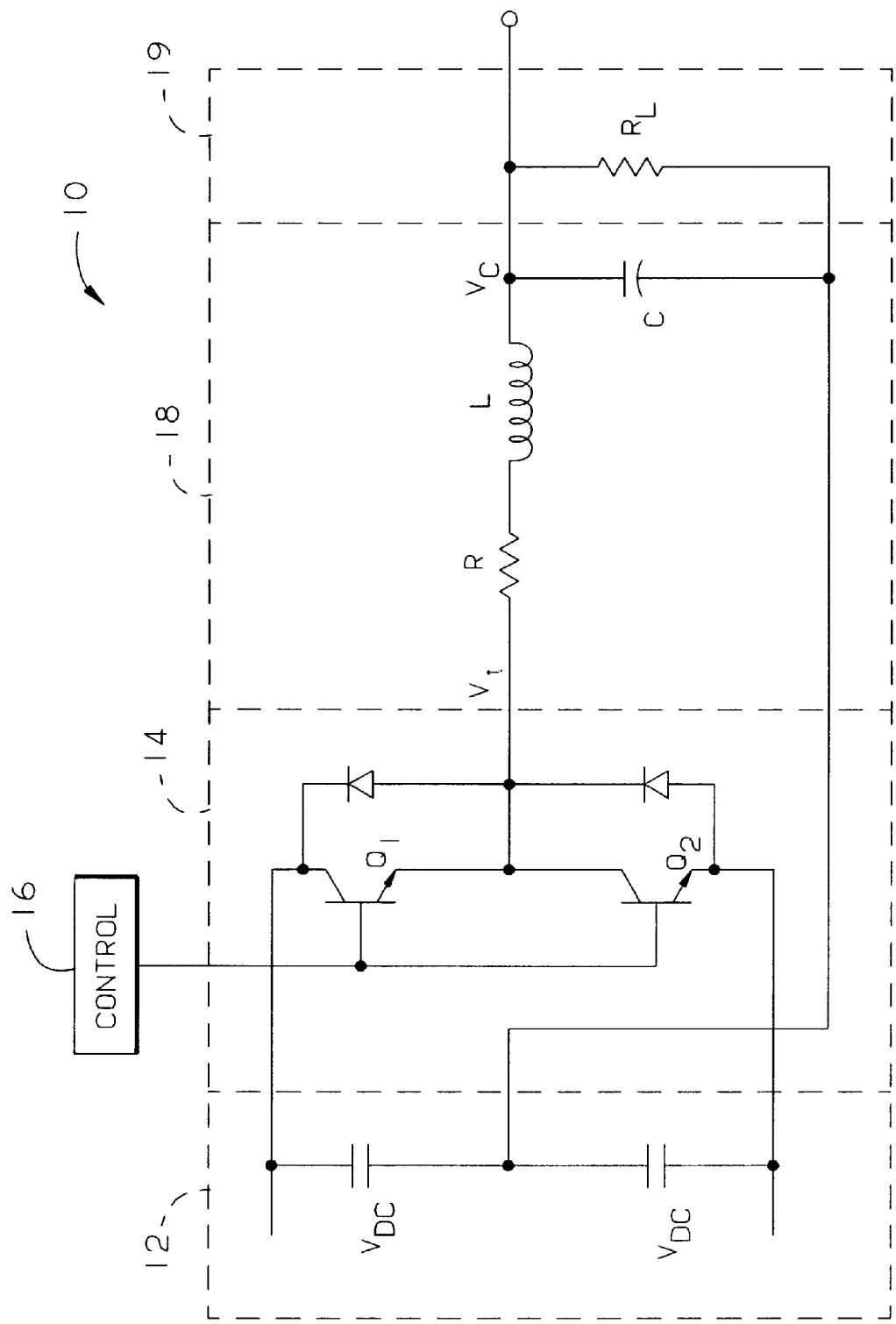
FIG. 1 is a schematic diagram of a conventional inverting system for inverting DC to AC.
Figure 2:
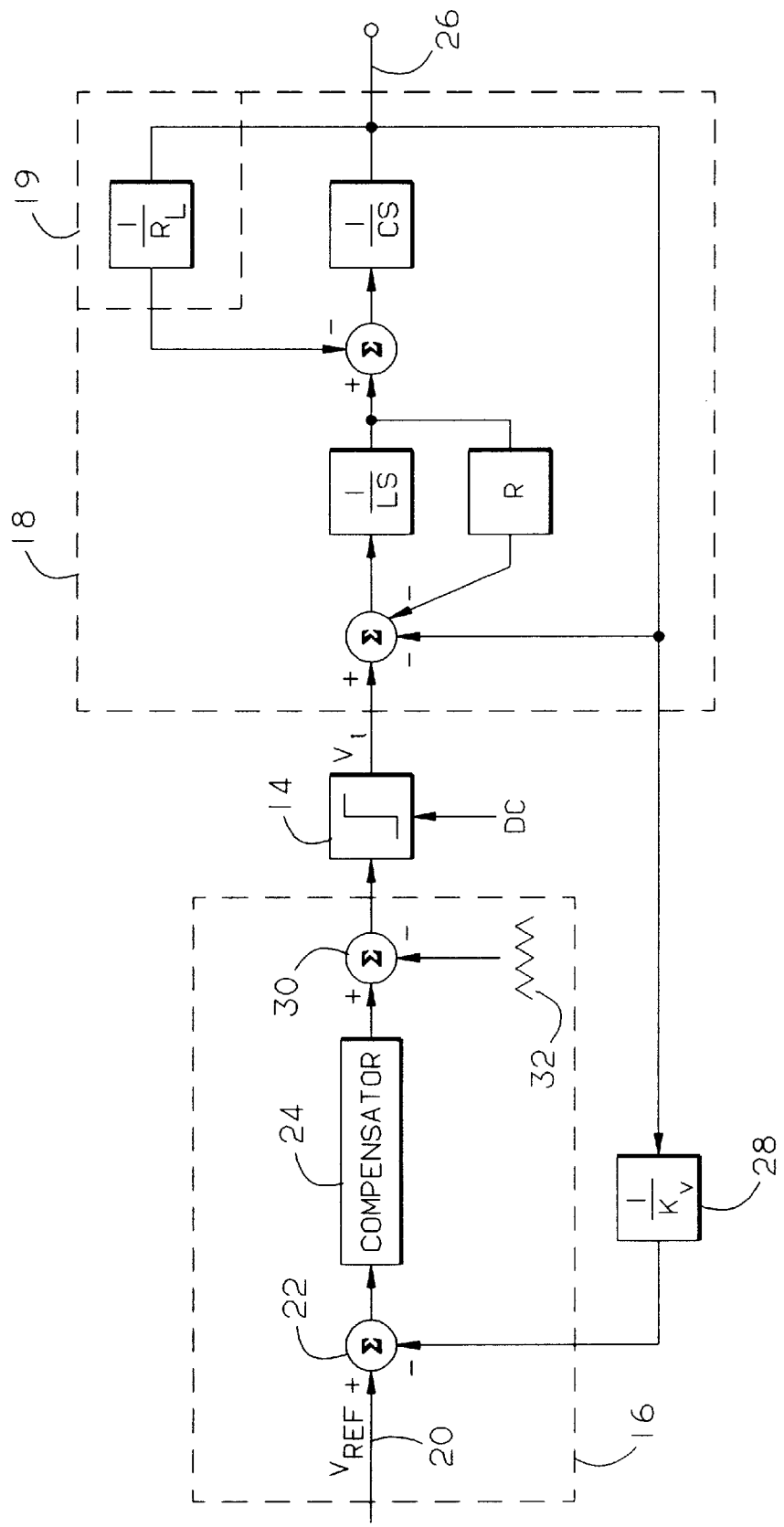
FIG. 2 illustrates the conventional inverting system of FIG. 1 in additional detail.
Figure 3:
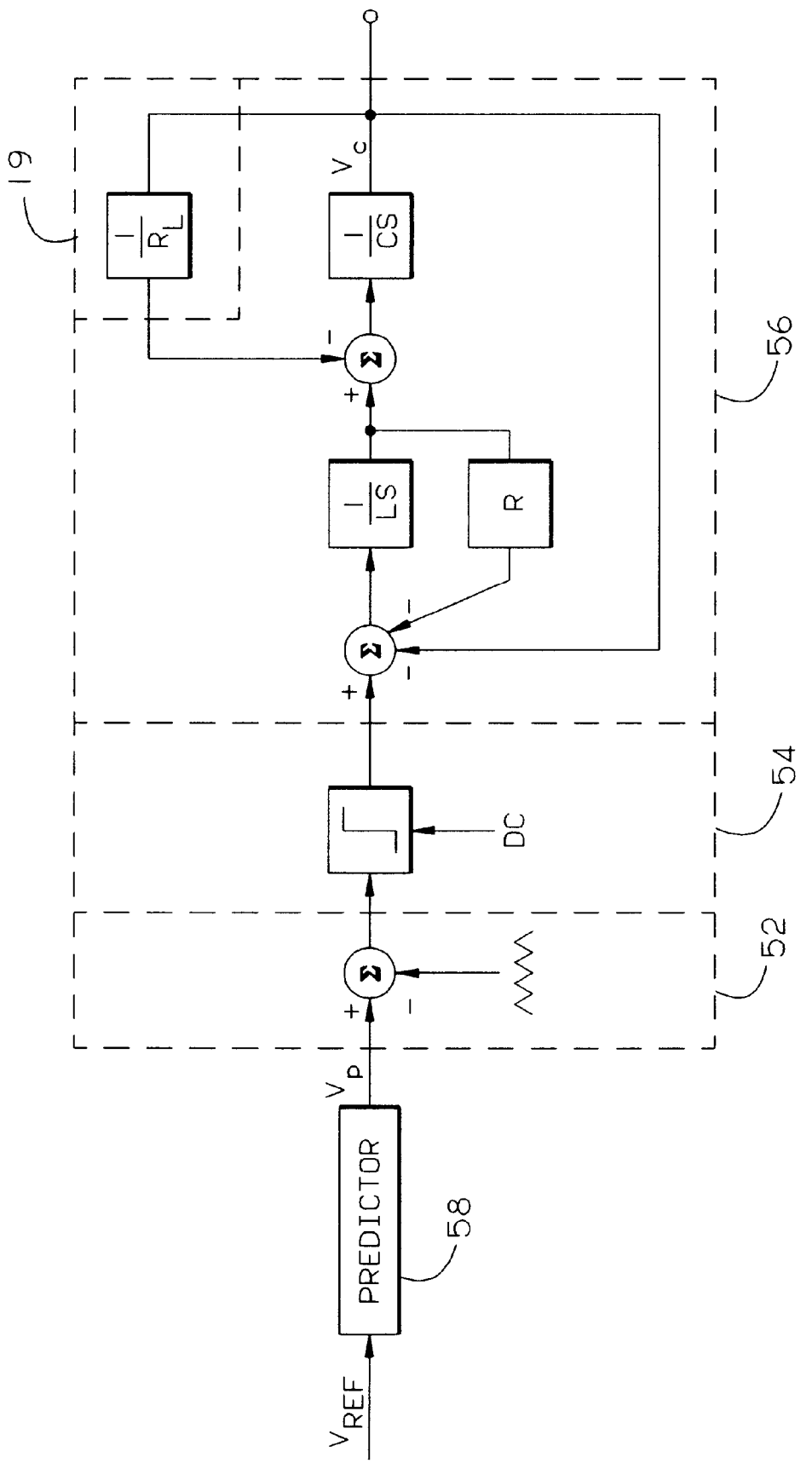
FIG. 3 illustrates a first embodiment of an inverting system in accordance with the present invention.

An inverting system 50 according to a first embodiment of the present invention is illustrated in FIG. 3. The inverting system 50 includes a pulse width modulator 52, an inverter switch 54 which may be similar to the inverter switch 14, and a filter 56 which may be similar to the filter 18. The inverting system 50 is arranged to supply sinusoidal AC to the load 19. The pulse width modulator 52 compares an input signal $V_P$ with a triangular wave form in order to provide output pulses having a duty cycle depending upon the relationship between the input $V_P$ and the triangular wave form. The output pulses from the pulse width modulator 52 may have a fixed frequency and operate the inverter switch 54 in order to invert input DC to output AC. The filter 56 filters the output AC from the inverter switch 54 in order to provide a sinusoidal output signal $V_C$.

The inverting system 50 also includes a predictor 58. The predictor 58 operates on a sinusoidal reference $V_{REF}$ with a transfer function that substantially neutralizes the attenuation and phase shift caused by the pulse width modulator 52, the inverter switch 54, and the filter 56. The predictor 58 is connected to the pulse width modulator 52 in a feed forward manner in order to supply the input $V_P$ to the pulse width modulator 52.

It can be shown that the transfer function $T_I$ of the filter 56 and the load 19 is given by the following equation:

$$T_I = \frac{1}{LCs^2 + \left(RC + \frac{L}{R_L}\right)s + \left(\frac{R}{R_L} + 1\right)}. \tag{1}$$

However, although a specific filter and load are disclosed for the filter 18 and the load 19, other filters and loads can be used. Accordingly, the transfer function $T_I$ may be different than that shown in equation (1) depending upon the particular filter that is used for the filter 18 and the particular load that is used for the load 19.

The pulse width modulator 52 operates according to a transfer function $T_{PWM}$. (In the typical case where the pulse width modulator 52 operates as a pure gain element, its transfer function may be designated $K_{PWM}$.) The predictor 58 should be arranged, therefore, to operate in accordance with the following transfer function:

$$T_P = \frac{LCs^2 + \left(RC + \frac{L}{R_L}\right)s + \left(\frac{R}{R_L} + 1\right)}{T_{PWM}} \tag{2}$$

Thus, the output signal $V_C$ of the inverting system 50 is given by the following equation:

$$V_C = V_{REF} T_P T_I T_{PWM} = V_{REF} \tag{3}$$

As seen by equation (3), the output signal $V_C$ from the inverting system 50 tracks the reference $V_{REF}$ substantially free of phase error and attenuation.

Figure 4:
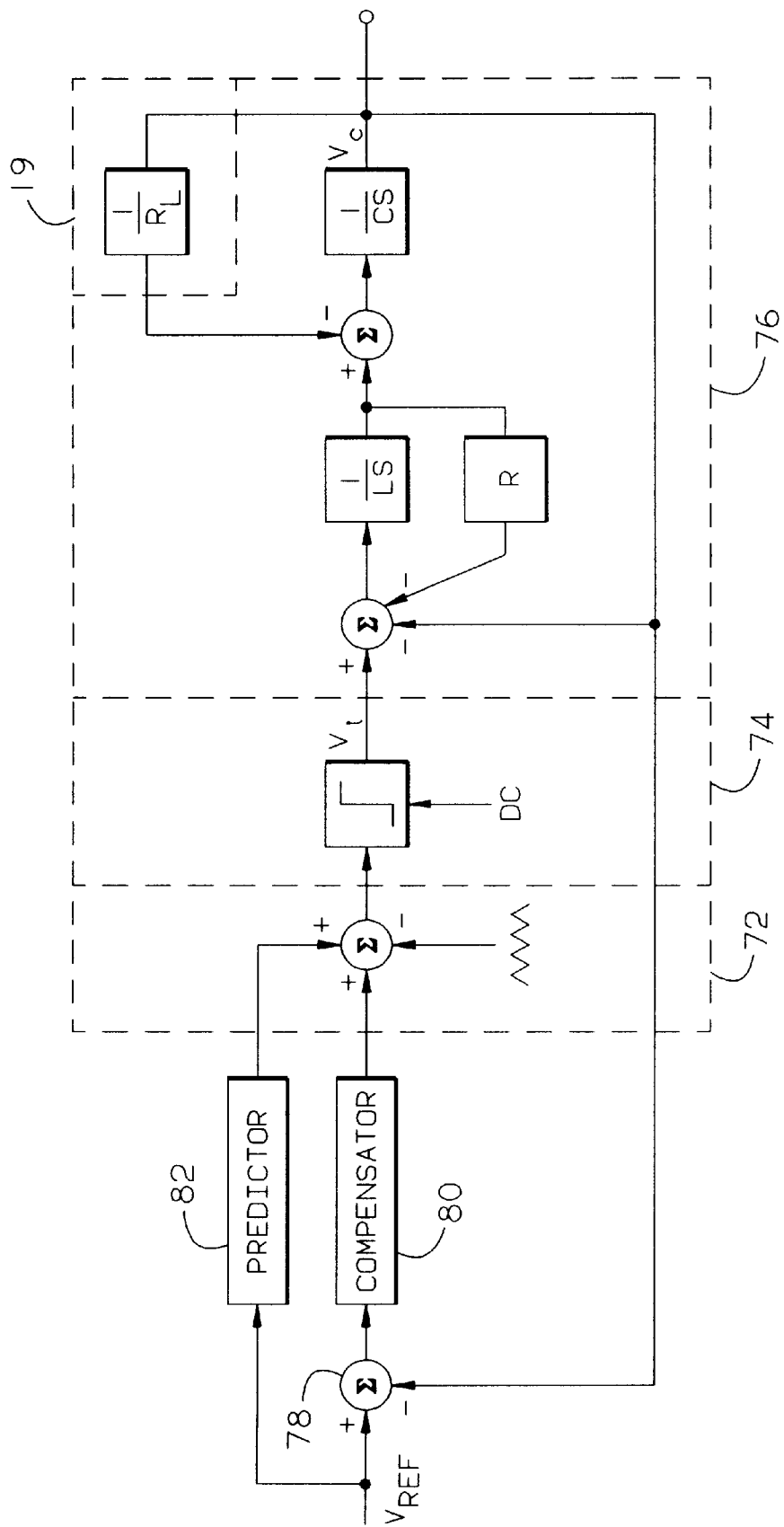
FIG. 4 illustrates a second embodiment of an inverting system in accordance with the present invention; and, FIG. 5 illustrates a third embodiment of an inverting system in accordance with the present invention.

An inverting system 70 as shown in FIG. 4 is similar to the inverting system 50 but provides closed loop operation. The inverting system 70 includes a pulse width modulator 72, an inverter switch 74, and a filter 76. A summer 78 subtracts the AC output signal $V_C$ of the filter 76 from the reference $V_{REF}$ in order to produce an error which is processed by a compensator 80 that operates according to the following transfer function:

$$\frac{K_C\left(1 + \frac{s}{\varpi_0}\right)^2}{s\left(1 + \frac{s}{\varpi_1}\right)} \tag{4}$$

The output from the compensator 80 provides one input to the pulse width modulator 72. The reference $V_{REF}$ is also provided directly to a predictor 82 which operates on the reference $V_{REF}$ with the transfer function of equation (3). The output of the predictor 82 provides another input to the pulse width modulator 72. The pulse width modulator 72 compares the sum of the output of the predictor 82 and the output of the compensator 80 to a triangular wave form in order to supply pulses having a variable duty cycle to the inverter switch 74.

It is noted that the transfer functions of the predictor 58 shown in FIG. 3 and the predictor 82 shown in FIG. 4 require differentiation. While it is certainly possible to implement differentiation, differentiation will amplify high frequency noises which exist in most electronically controlled systems to the point where amplifiers saturate. Thus, it is desirable to avoid the use of differentiation where possible. Accordingly, an inverting system 90 shown in FIG. 5 incorporates a predictor which requires no differentiation.

Figure 5:
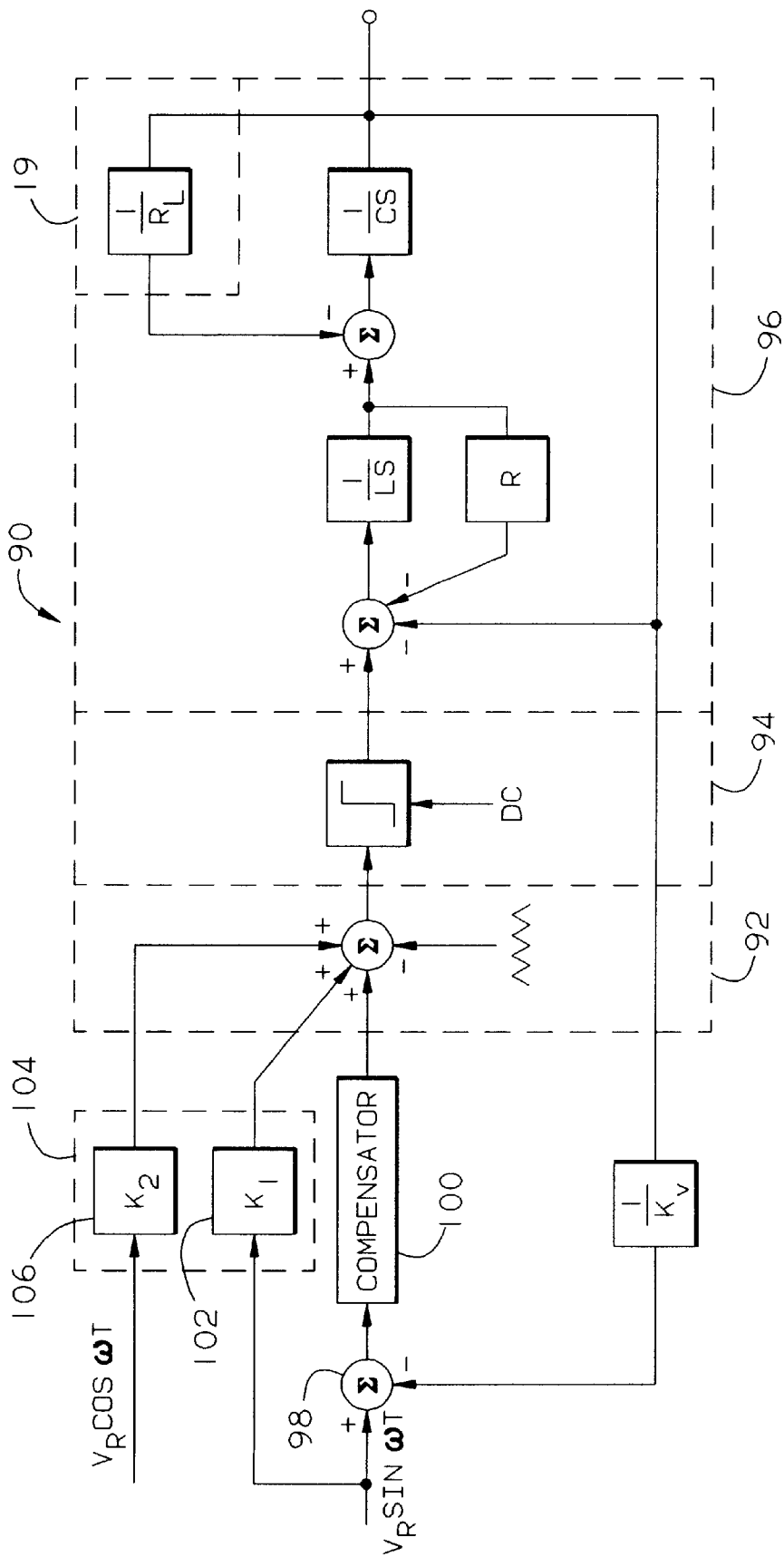

The inverting system 90 shown in FIG. 5 includes a pulse width modulator 92, an inverter switch 94, and a filter 96. The output signal $V_C$ from the filter 96 is connected back to one input of a summer 98 which receives a reference $V_R \sin \overline{\omega} t$. The summer 98 compares the reference $V_R \sin \overline{\omega} t$ to the output signal $V_C$ from the filter 96 in order to generate an error which is processed by a compensator 100 that may have a transfer function similar to the compensator 80 of FIG. 4. The output of the compensator 100 provides one input to the pulse width modulator 92.

The reference $V_R \sin \overline{\omega} t$ is also supplied to a first portion 102 of a predictor 104. The first portion 102 of the predictor 104 has a transfer function $K_1$. A supplemental reference $V_R \cos \overline{\omega} t$ is applied to a second portion 106 of the predictor 104. The second portion 106 of the predictor 104 has a transfer function $K_2$. Outputs from the first and second portions 102 and 106 of the predictor 104 provide corresponding inputs to the pulse 20 width modulator 92.

The transfer functions $K_1$ and $K_2$ may be derived as follows. If the reference is given as $V_{REF} = V_R \sin \overline{\omega} t$, and if this reference is processed by the transfer function given by equation (2) above, then the output of the predictor 104 can be rewritten according to the following equation:

$$V_P = V_R(K_1 \sin \overline{\omega} t + K_2 \cos \overline{\omega} t) \tag{5}$$

where $K_1$ is given by the following equation:

$$K_1 = \frac{\left(\frac{R}{R_L} + 1\right) - \varpi^2 LC}{T_{PWM}} \tag{6}$$

and $K_2$ is given by the following equation:

$$K_2 = \frac{\varpi\left(RC + \frac{L}{R_L}\right)}{T_{PWM}} \tag{7}$$

Thus, by splitting the reference into a sine portion and a cosine portion, differentiation may be eliminated from the transfer function of the predictor 104.

The pulse width modulator 92 compares the sum of the output from the first portion 102 of the predictor 104, the output from the second portion 106 of the predictor 104, and the output from the compensator 100 to a triangular wave form. Accordingly, the pulse width modulator 92 combines the outputs of the first portion 102, the second portion 106, and the compensator 100 in order to establish a reference level, and compares that reference level to the triangular wave form. The relationship between the reference and the triangular wave form establishes the duty cycle of the output pulses of the pulse width modulator 92. These pulses switch the inverter switch 94 in order to invert DC to AC which is filtered by the filter 96 so as to provide an output AC that tracks the reference $V_{REF}$ without phase error and without attenuation.

Certain modifications of the present invention have been discussed above. Other modifications will occur to those practicing in the art of the present invention. For example, the present invention may be implemented in software, in hardware, in a combination of software and hardware, and/or with other elements such as programmable logic arrays and/or the like.

Also, the reference $V_{REF}$ can be sinusoidal as described above or have any other suitable wave form.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. An inverting system comprising:
   an inverter having a transfer function $T_I$;
   a reference; and,
   a predictor coupled in a feed forward manner between the inverter and the reference, wherein the predictor has a transfer function $T_P$ which is substantially equal to $1/T_I$ so that an output of the inverter tracks the reference with substantially zero phase error.

2. The inverting system of claim 1 wherein the reference is a sinusoidal reference.

3. The inverting system of claim 1 wherein the inverter comprises a pulse width modulator coupled to the predictor.

4. The inverting system of claim 1 wherein the reference comprises a reference $V_R \sin \overline{\omega}t$ and a reference supplement $V_R \cos \overline{\omega}t$, wherein the predictor comprises a first predictor $K_1$ and a second predictor $K_2$, wherein the first predictor $K_1$ is applied to the reference $V_R \sin \overline{\omega}t$ so that the first predictor has an output $K_1 V_R \sin \overline{\omega}t$, wherein the second predictor $K_2$ is applied to the reference supplement $V_R \cos \overline{\omega}t$ so that the second predictor has an output $K_2 V_R \cos \overline{\omega}t$, wherein the output $K_1 V_R \sin \overline{\omega}t$ and the output $K_2 V_R \cos \overline{\omega}t$ are added to form $V_R(K_1 \sin \overline{\omega}t + K_2 \cos \overline{\omega}t)$, and wherein the first predictor $K_1$ and the second predictor $K_2$ are arranged so that an output of the inverter tracks the reference $V_R \sin \overline{\omega}t$ with zero phase error.

5. The inverting system of claim 1 wherein the inverter has an output $V_C$, wherein the reference is $V_{REF}$, and wherein the inverter, the reference, and the predictor are coupled together so that $V_C = V_{REF} T_P T_I = V_{REF}$.

6. An inverting system comprising:
   a reference $V_{REF}$;
   a predictor having an input coupled to the reference $V_{REF}$, wherein the predictor has an output $V_P$, and wherein the predictor has a transfer function $T_P$; and,
   an inverter having a pulse width modulator and a filter, wherein the inverter has a transfer function $T_I$, wherein the transfer function $T_P$ is substantially equal to $1/T_I$, wherein the inverter has an output $V_C$, and wherein the inverter is coupled to the predictor so that the predictor operates in a feed forward manner and so that the output $V_C = V_{REF} T_P T_I = V_{REF}$.

7. The inverting system of claim 6 wherein the reference is a sinusoidal reference.

8. The inverting system of claim 6 wherein the pulse width modulator comprises a comparator having first and second inputs and an output, wherein the first input is coupled to the output $V_P$, wherein the second input is coupled to receive a signal having a triangular waveform, and wherein the filter is coupled to the output of the comparator.

9. The inverting system of claim 6 wherein the transfer function $T_I$ has the following form:

$$T_I = \frac{T_{PWM}}{LCs^2 + \left(RC + \frac{L}{R_L}\right)s + \left(\frac{R}{R_L} + 1\right)}$$

wherein L represents an inductance of the filter, wherein C represents a capacitance of the filter, wherein R and $R_L$ represent resistances of the filter, and wherein $T_{PWM}$ represents a transfer function of the pulse width modulator.

10. The inverting system of claim 9 wherein the transfer function $T_P$ has the following form:

$$T_P = \frac{LCs^2 + \left(RC + \frac{L}{R_L}\right)s + \left(\frac{R}{R_L} + 1\right)}{T_{PWM}}.$$

11. The inverting system of claim 6 wherein the reference comprises a reference $V_R \sin \overline{\omega}t$ and a reference supplement $V_R \cos \overline{\omega}t$, wherein the predictor comprises a first predictor $K_1$ and a second predictor $K_2$, wherein the first predictor $K_1$ is applied to the reference $V_R \sin \overline{\omega}t$ so that the first predictor has an output $K_1 V_R \sin \overline{\omega}t$, wherein the second predictor $K_2$ is applied to the reference supplement $V_R \cos \overline{\omega}t$ so that the second predictor has an output $K_2 V_R \cos \overline{\omega}t$, wherein the output $K_1 V_R \sin \overline{\omega}t$ and the output $K_2 V_R \cos \overline{\omega}t$ are added to form $V_R(K_1 \sin \overline{\omega}t + K_2 \cos \overline{\omega}t)$, and wherein the first predictor $K_1$ and the second predictor $K_2$ are arranged so that an output of the inverter tracks the reference $V_R \sin \overline{\omega}t$ with zero phase error.

12. The inverting system of claim 11 wherein the transfer function $T_I$ has the following form:

$$T_I = \frac{T_{PWM}}{LCs^2 + \left(RC + \frac{L}{R_L}\right)s + \left(\frac{R}{R_L} + 1\right)}$$

wherein L represents an inductance of the inverter, wherein C represents a capacitance of the inverter, wherein R and $R_L$ represent resistances of the inverter, and wherein $T_{PWM}$ represents a transfer function of the inverter.

13. The inverting system of claim 12 wherein $K_1$ has the following form:

$$K_1 = \frac{\left(\frac{R}{R_L}+1\right)-\varpi^2 LC}{T_{PWM}}$$

and $K_2$ has the following form:

$$K_2 = \frac{\varpi\left(RC+\frac{L}{R_L}\right)}{T_{PWM}}.$$

14. A method of inverting DC to AC comprising the following steps:
   a) passing a reference $V_{REF}$ through a transfer function $1/(T_I T_{PWM})$ in a feed forward manner;
   b) pulse width modulating an output of the transfer function $1/(T_I T_{PWM})$ according to a transfer function $T_{PWM}$;
   c) controlling a switch in accordance with a pulse width modulated output of the transfer function $T_{PWM}$; and,
   d) processing an output of the switch with a transfer function $T_I$ in order to provide an AC output $V_C$ according to the following equation:

$$V_C = V_{REF}\left(\frac{1}{T_I T_{PWM}}\right) T_{PWM} T_I = V_{REF}.$$

15. The method of claim 14 wherein the reference $V_{REF}$ is a sinusoidal reference.

16. The method of claim 14 wherein step b) comprises the step of comparing the output of the transfer function $1/(T_I T_{PWM})$ to a triangular waveform.

17. The method of claim 14 wherein step d) comprises the step of filtering the output of the switch with the transfer function $T_I$ in order to provide the AC output $V_C = V_{REF}(1/T_I T_{PWM}) T_{PWM}(T_I) = V_{REF}$.

18. The method of claim 14 wherein $1/(T_I T_{PWM})$ has the following form:

$$\frac{1}{T_I T_{PWM}} = \frac{LCs^2 + \left(RC+\frac{L}{R_L}\right)s + \left(\frac{R}{R_L}+1\right)}{T_{PWM}}$$

wherein L represents an inductance, wherein C represents a capacitance, and wherein R and $R_L$ represent resistances.

19. The method of claim 14 wherein step a) comprises the following steps:
   passing a reference $V_R \sin \overline{\omega} t$ through a transfer function $K_1/T_{PWM}$;
   passing a reference supplement $V_R \cos \overline{\omega} t$ through a transfer function $K_2/T_{PWM}$; and,
   adding $K_1 V_R \sin \overline{\omega} t/T_{PWM}$ and $K_2 V_2 \cos \overline{\omega} t/T_{PWM}$ for processing according to step b).

20. The method of claim 19 wherein $K_1$ has the following form:

$$K_1 = \left(\frac{R}{R_L}+1\right)-\varpi^2 LC$$

and $K_2$ has the following form:

$$K_2 = \varpi\left(RC+\frac{L}{R_L}\right).$$

21. The method of claim 20 wherein the transfer function $T_I$ is given by the following equation:

$$T_I = \frac{1}{LCs^2 + \left(RC+\frac{L}{R_L}\right)s + \left(\frac{R}{R_L}+1\right)}$$

wherein L represents an inductance, wherein C represents a capacitance, and wherein R and $R_L$ represent resistances.

* * * * *